(12) United States Patent
Li et al.

(10) Patent No.: US 11,093,818 B2
(45) Date of Patent: Aug. 17, 2021

(54) CUSTOMER PROFILE LEARNING BASED ON SEMI-SUPERVISED RECURRENT NEURAL NETWORK USING PARTIALLY LABELED SEQUENCE DATA

(71) Applicant: INTERNATIONAL BUSINESS MACHINES CORPORATION, Armonk, NY (US)

(72) Inventors: Hongfei Li, Briarcliff Manor, NY (US); Anshul Sheopuri, Teaneck, NJ (US); Jinfeng Yi, Ossining, NY (US); Qi Yu, Los Angeles, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 791 days.

(21) Appl. No.: 15/095,916

(22) Filed: Apr. 11, 2016

(65) Prior Publication Data
US 2017/0293836 A1 Oct. 12, 2017

(51) Int. Cl.
*G06N 3/04* (2006.01)

(52) U.S. Cl.
CPC .......... *G06N 3/0445* (2013.01); *G06N 3/0454* (2013.01)

(58) Field of Classification Search
CPC ............ G06N 3/005; G06N 3/02; G06N 3/04; G06N 3/0445; G06N 3/0454; G06N 3/049; G06N 3/08; G06N 3/088; G06N 7/046; G10L 15/16; G10L 25/30; G06F 17/30958; G06K 9/4628; G06K 9/66; G06Q 30/00; G06Q 30/0643
See application file for complete search history.

(56) References Cited

U.S. PATENT DOCUMENTS

| 7,287,014 | B2 | 10/2007 | Chen et al. |
| 7,321,882 | B2 | 1/2008 | Jaeger |
| 2016/0307566 | A1* | 10/2016 | Bellegarda ........... G06N 3/0454 |

FOREIGN PATENT DOCUMENTS

WO 2015180368 12/2015

OTHER PUBLICATIONS

Liang et al., Semantic Object Parsing with Grapg LSTM, 18 pages, Mar. 2016. (Year: 2016).*

(Continued)

*Primary Examiner* — Kamran Afshar
*Assistant Examiner* — Marshall L Werner
(74) *Attorney, Agent, or Firm* — Tutunjian & Bitetto, P.C.; Joseph Petrokaitis

(57) ABSTRACT

A method and system are provided. The method includes receiving by a computer having a processor and a memory, sequence data that includes labeled data and unlabeled data. The method further includes generating, by the computer having the processor and the memory, a recurrent neural network model of the sequence data, the recurrent neural network model having a recurrent layer and an aggregate layer. The recurrent neural network model feeds sequences generated from the recurrent layer into the aggregate layer for aggregation, stores temporal dependencies in the sequence data, and generates labels for at least some of the unlabeled data.

17 Claims, 12 Drawing Sheets

(56) References Cited

OTHER PUBLICATIONS

Bertoni et al., COSNet: a Cost Sensitive Neural Network for Semi-supervised Learning in Graphs, 16 pages, 2011. (Year: 2011).*
Li et al., Gated Graph Sequence Neural Networks, pp. 1-19, Nov. 2015. (Year: 2015).*
Vieira et al., Predicting online user behavior using deep learning algorithms, p. 1-21, Nov. 2015. (Year: 2015).*
Lee, Dong-Hyun, Pseudo-Label: The Simple and Efficient Semi-Supervised Learning Method for Deep Neural Networks, ICML 2013 Workshop: Challenges in Representation Learning (WREPL), 2013. (Year: 2013).*
Rajkumar et al., Neural Network Design in Cloud Computing, International Journal of Computer Trends and Technology, vol. 4, Issue 2, 2013. (Year: 2013).*
Zhang et al., Sequential Click Prediction for Sponsored Search with Recurrent Neural Networks, Proceedings of the Twenty-Eighth AAAI Conference on Artificial Intelligence, pp. 1369-1375, 2014. (Year: 2014).*
Jain et al., Structural-RNN: Deep Learning on Spatio-Temporal Graphs, pp. 1-10, Nov. 2015. (Year: 2015).*
Kipf, Thomas, Recurrent Neural Networks for Graph-Based 3D Agglomeration, Mar. 2016. (Year: 2016).*
Liao, et al., Image Representation Learning Using Graph Regularized Auto-Encoders, pp. 1-10, Feb. 2014. (Year: 2014).*
Harvey et al., Semi-supervised Learning with Encoder-Decoder Recurrent Neural Networks: Experiments with Motion Capture Sequences, pp. 1-10, Nov. 2015. (Year: 2015).*

\* cited by examiner

CUSTOMER PROFILE LEARNING BASED ON SEMI-SUPERVISED RECURRENT NEURAL NETWORK USING PARTIALLY LABELED SEQUENCE DATA

BACKGROUND

Technical Field

The present invention generally relates to data processing, and more particularly to customer profile learning based on semi-supervised recurrent neural network using partially labelled sequence data.

Description of the Related Art

The determination and subsequent use of customer profiles provides many benefits both to the producer/seller as well as to the consumer. For example, producers/sellers can better target customer needs based on customer profiles, while customers can received more appropriate items based on their profile. However, determining a customer profile can be quite difficult, particularly when applied to unlabeled data. Typically for data modeling, such unlabeled data is often separated from the training set and ignored during the process. Moreover, obtaining labels is typically an expensive and time consuming process.

As an example, in certain scenarios such as spatio-temporal sequences obtained from mobile devices, due to the infrequent user engagement and the high cost of obtaining labels, only a small subset of data have labels. This poses new challenges to the predictive modeling and analytical tasks.

SUMMARY

According to an aspect of the present principles, a method is provided. The method includes receiving by a computer having a processor and a memory, sequence data that includes labeled data and unlabeled data. The method further includes generating, by the computer having the processor and the memory, a recurrent neural network model of the sequence data, the recurrent neural network model having a recurrent layer and an aggregate layer. The recurrent neural network model feeds sequences generated from the recurrent layer into the aggregate layer for aggregation, stores temporal dependencies in the sequence data, and generates labels for at least some of the unlabeled data.

According to another aspect of the present principles, a system is provided. The system includes a computer, having a processor and a memory, configured to: receive by a computer having a processor and a memory, sequence data that includes labeled data and unlabeled data; and generate, by the computer having the processor and the memory, a recurrent neural network model of the sequence data, the recurrent neural network model having a recurrent layer and an aggregate layer. The recurrent neural network model feeds sequences generated from the recurrent layer into the aggregate layer for aggregation, stores temporal dependencies in the sequence data, and generates labels for at least some of the unlabeled data.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

The present principles are directed to customer profile learning based on semi-supervised recurrent neural network using partially labelled sequence data.

The present principles provide a system and method capable of learning customer segmentations in the presence of labeled and unlabeled customer behaviors (e.g., represented by a sequence of activities).

Figure 1:
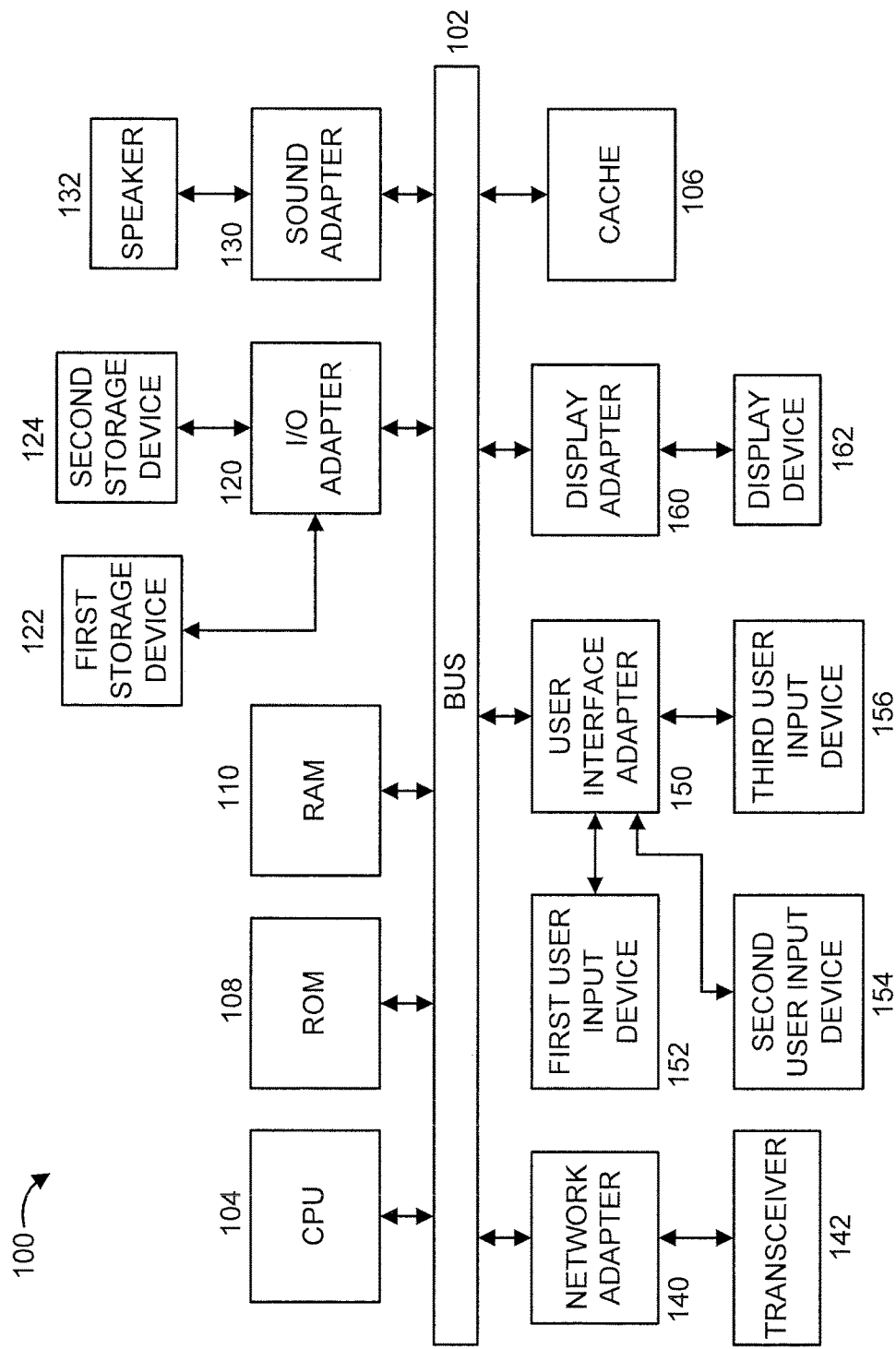
FIG. 1 shows an exemplary processing system to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
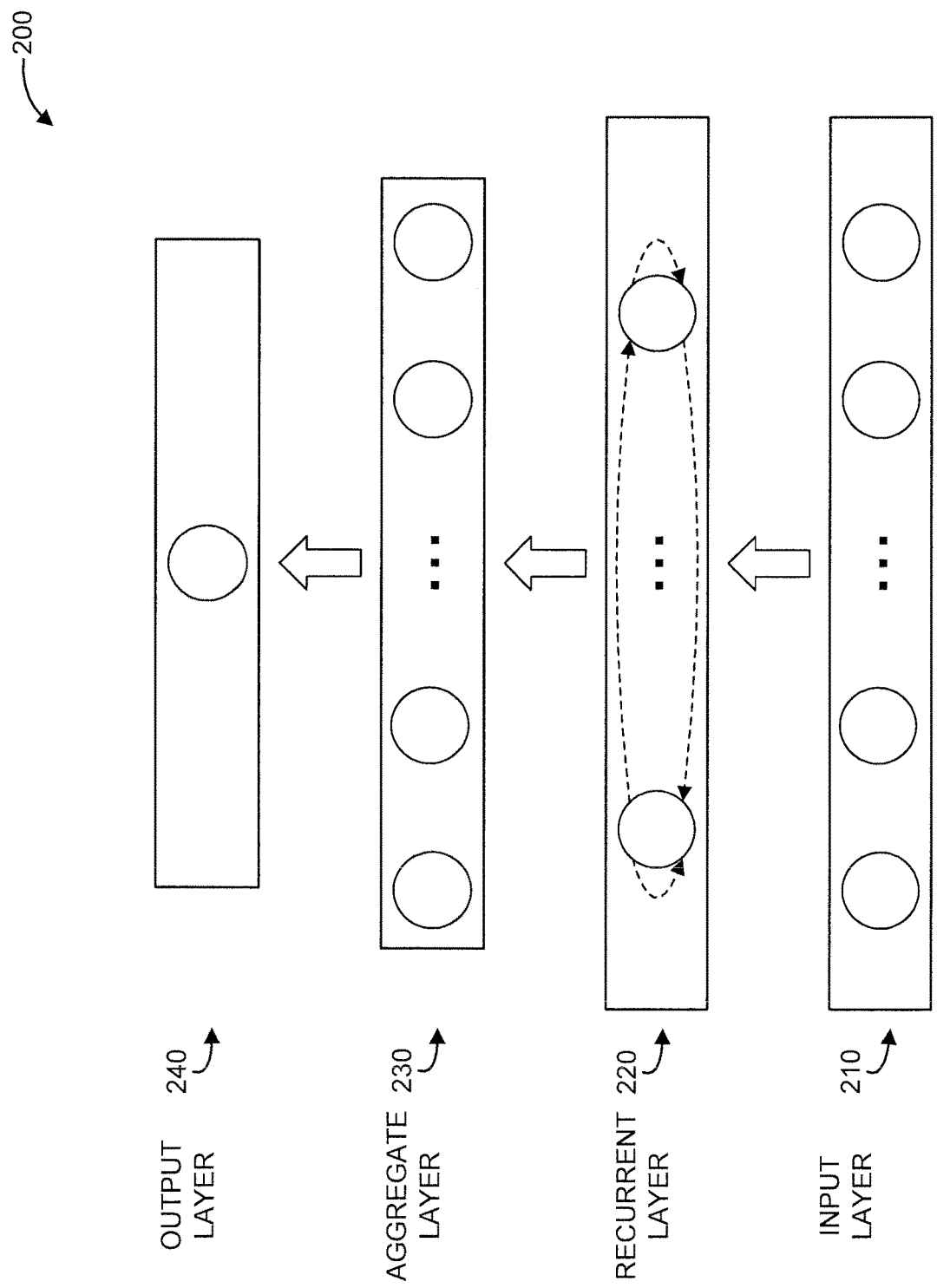
FIG. 2 shows an exemplary recurrent neural network for customer profile learning that uses partially labelled sequence data, in accordance with an embodiment of the present principles.

FIG. 2 shows an exemplary recurrent neural network (RNN) 200 for customer profile learning that uses partially labelled sequence data, in accordance with an embodiment of the present principles.

The recurrent neural network 200 includes an input layer 210, a recurrent layer 220, an aggregate layer 230, and an output layer 240.

The input layer 210 inputs spatio-temporal trajectories of customers.

The recurrent layer 220 captures temporal correlations in the spatio-temporal trajectories of the customers.

Figure 3:
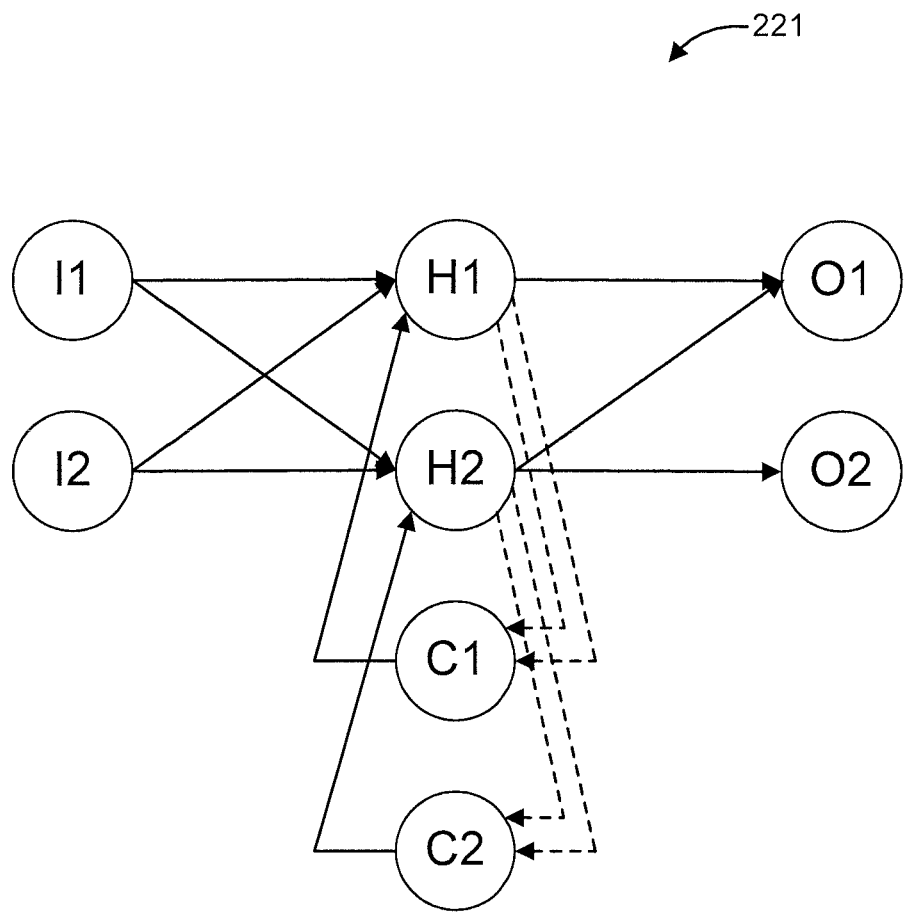
FIG. 3 shows an exemplary structure/configuration of the recurrent neural network, in accordance with an embodiment of the present principles.

The recurrent layer 220 is formed using a recurrent neural network 221 (also interchangeably referred to herein as "recurrent neural network model"). The recurrent neural network 221 is a neural network model in which directed cycles exist among neurons. The existence of the directed cycles among the neurons allow internal states (memory) in the model, thereby endowing the model with dynamic temporal behavior. FIG. 3 shows an exemplary structure/configuration of the recurrent neural network 221, in accordance with an embodiment of the present principles. It is to be appreciated that the structure/configuration of recurrent neural network 221 shown in FIG. 3 is one of many possible structures/configurations capable of being employed in accordance with the teachings of the present principles. Thus, one of ordinary skill in the art will contemplate this and various other structures/configurations of a recurrent neural network to which the present principles can be applied, while maintaining the spirit of the present principles.

The aggregate layer 230 encodes latent representations of customer profiles.

Figure 4:
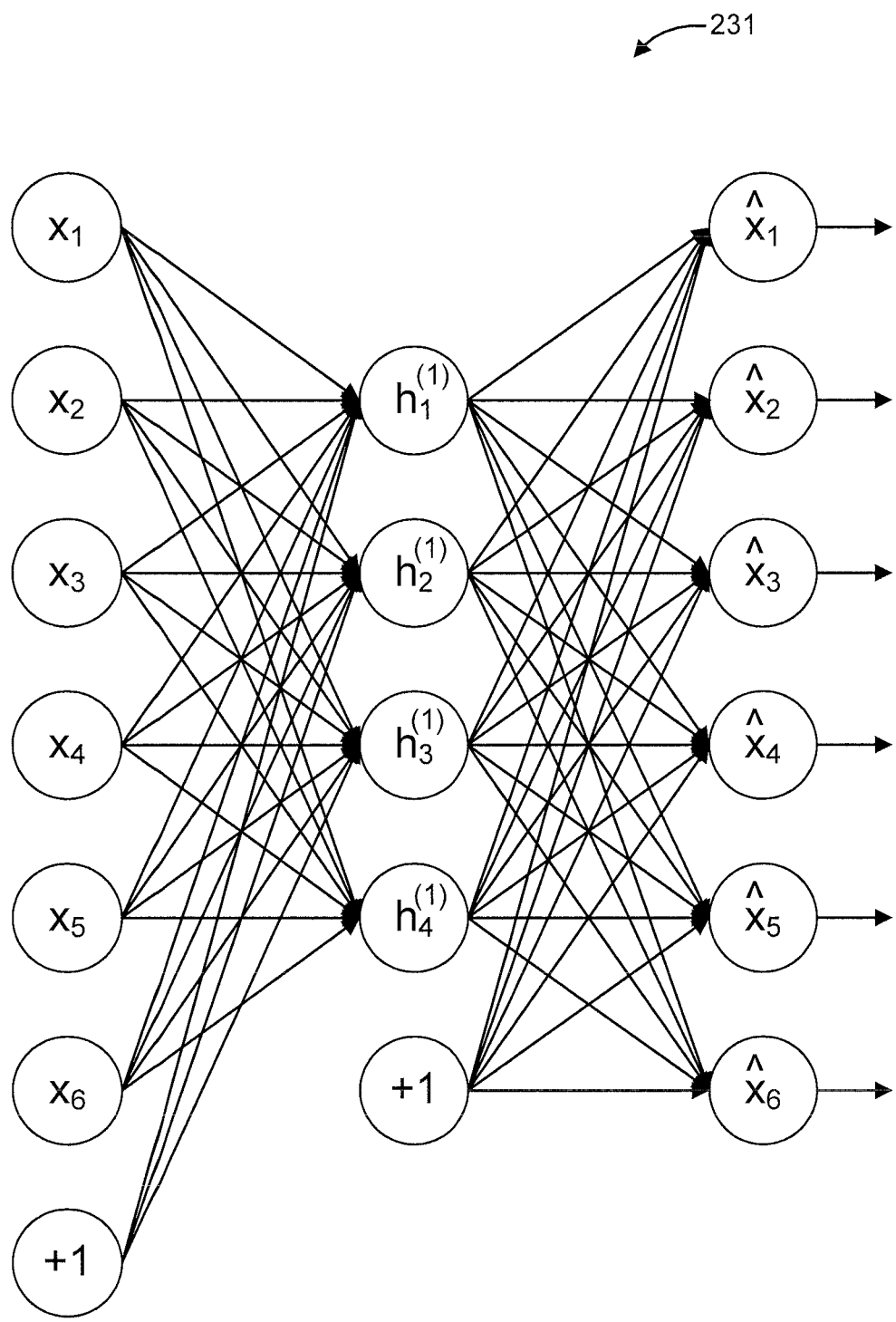
FIG. 4 shows an exemplary structure/configuration of the auto-encoder, in accordance with an embodiment of the present principles.

The aggregate layer 230 is formed using an auto-encoder 231 (also interchangeably referred to herein as "auto-encoder model"). The auto encoder 231 is a generative model that aims to learn a compressed, distributed representation of the data, for the purpose of dimension reduction. FIG. 4 shows an exemplary structure/configuration of the auto-encoder 231, in accordance with an embodiment of the present principles. It is to be appreciated that the structure/configuration of auto-encoder 231 is one of many possible structures/configurations capable of being employed in accordance with the teachings of the present principles. Thus, one of ordinary skill in the art will contemplate this and various other structures/configurations of an auto-encoder to which the present principles can be applied, while maintaining the spirit of the present principles.

The output layer 240 outputs user action labels.

As evident from FIG. 2, the recurrent neural network model 221 and the auto encoder model 231 are stacked in order to provide a deep recurrent neural network for customer profiling.

Each layer can have multiple neuron-like units or nodes (hereinafter "nodes"), with each of the nodes connected to the other nodes. The input layer 210 includes input nodes, the output layer 240 includes output nodes, while the recurrent layer 220 and the aggregate layer 230 include hidden nodes. As an example to which RNN 200 can be applied, in the case of speech where a person utters a spoken digit, the input sequence is the speech signal corresponding to the spoken digit or a representation thereof, which can be unlabeled, while the output can be a label classifying the spoken digit. In the case of input data representing click behavior, the output can be a label classifying, for example, but not limited to, an item or item type purchased that involved clicking, an item or item type perused that involved clicking, an amount spent during a shopping session that involved clicking, and so forth. One of ordinary skill in the art can readily contemplate the preceding and other examples of possible output labels based on the input sequence provided, which depends on the implementation.

Figure 10:
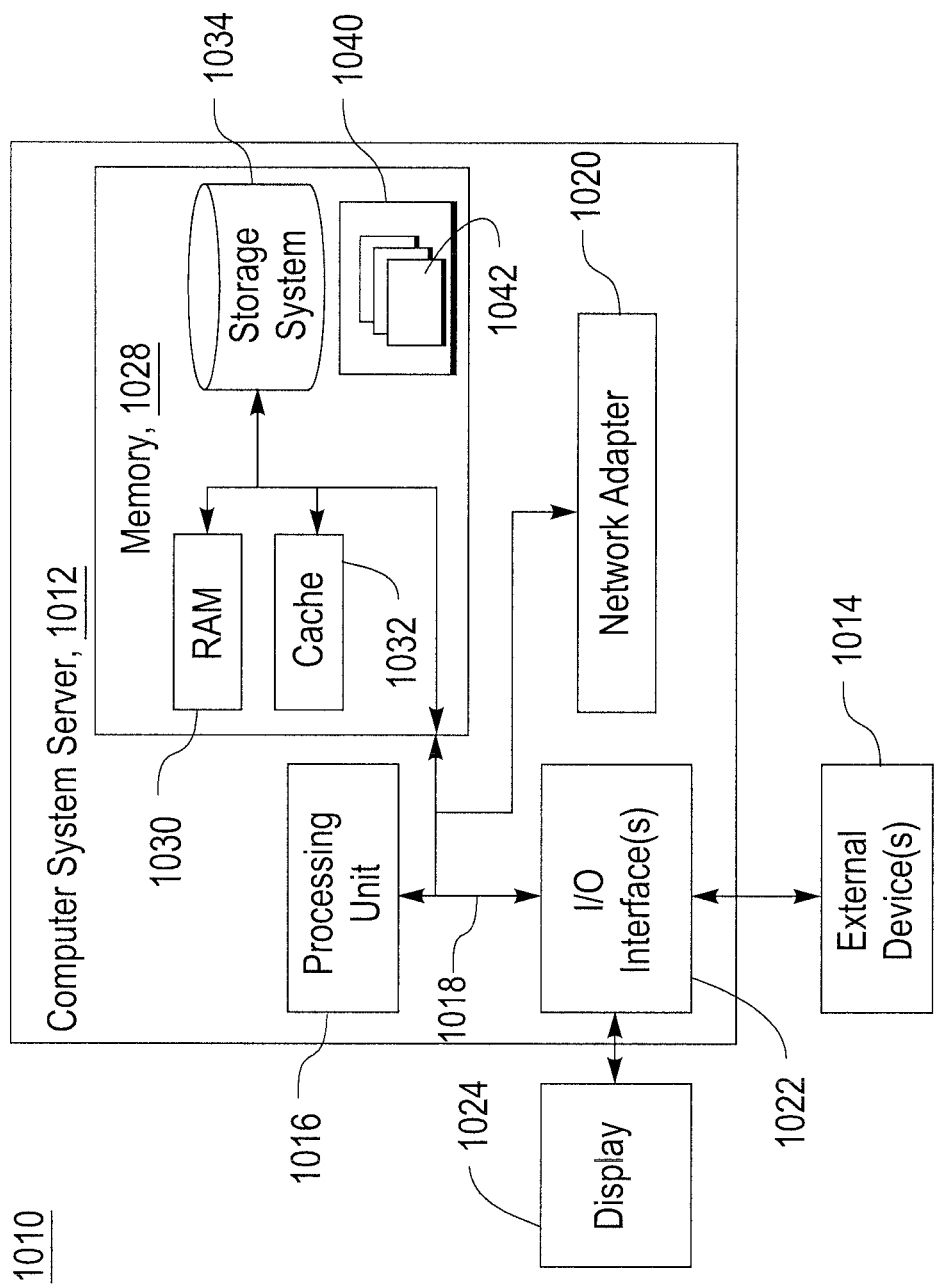
FIG. 10 shows an exemplary cloud computing node, in accordance with an embodiment of the present principles.
Figure 11:
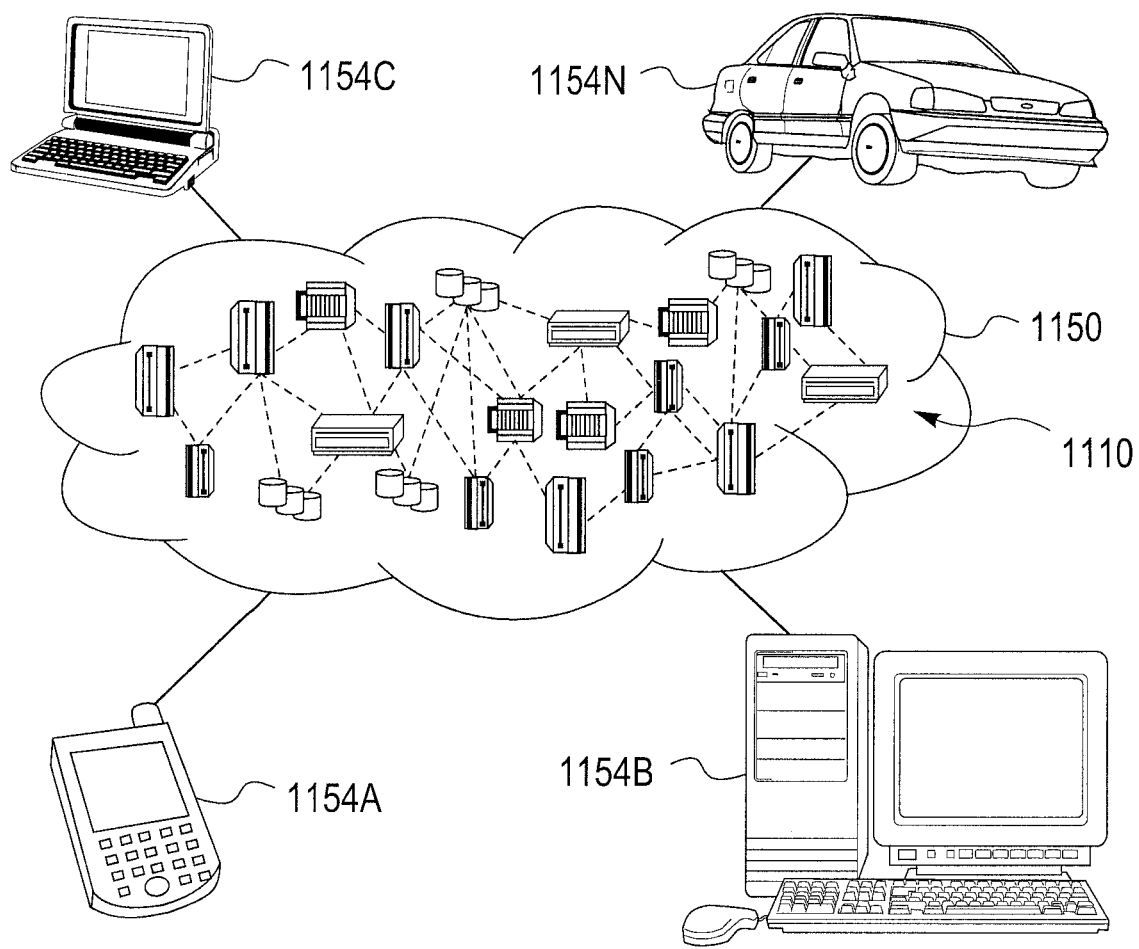
FIG. 11 shows an exemplary cloud computing environment, in accordance with an embodiment of the present principles.
Figure 12:
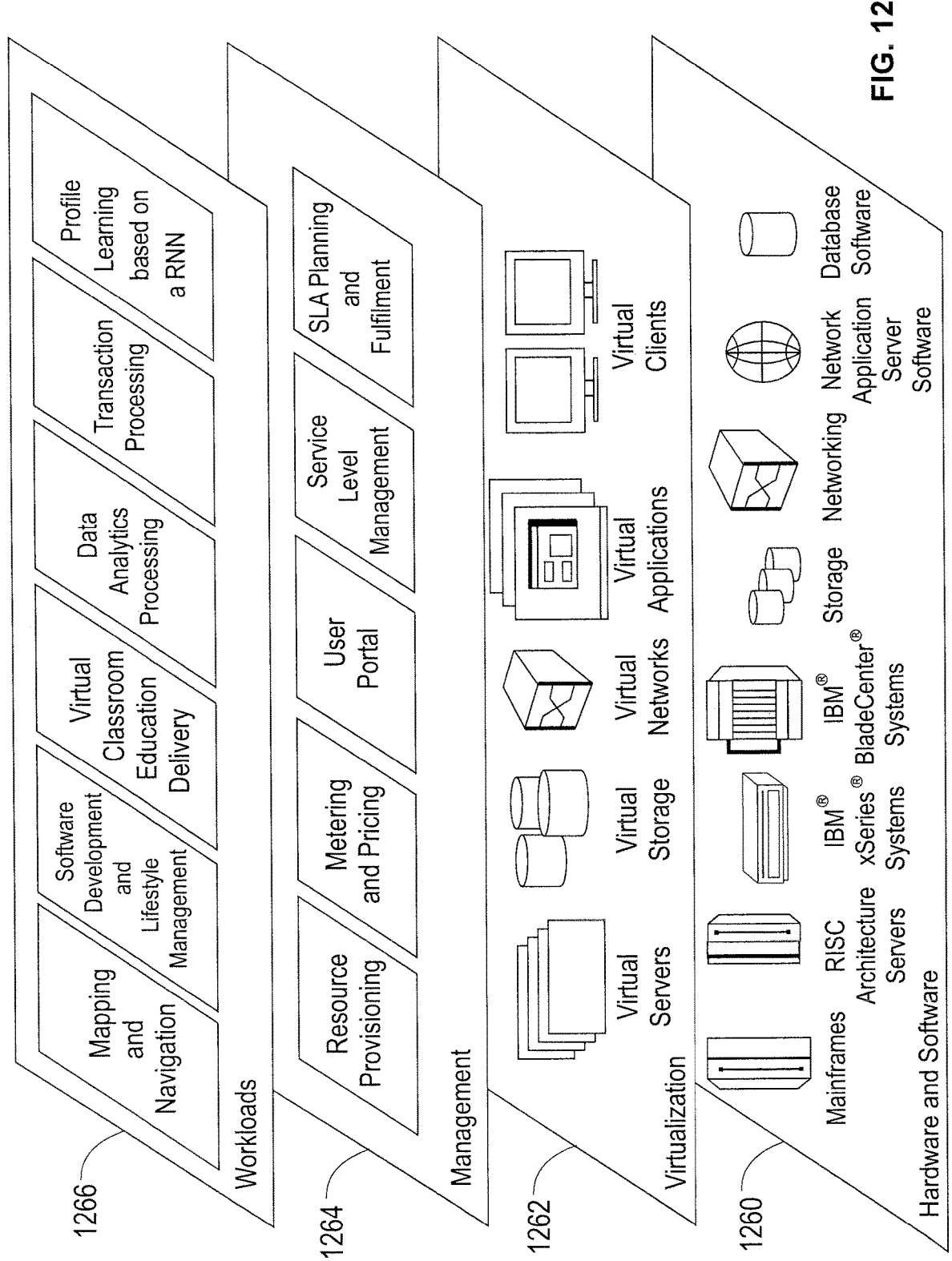
FIG. 12 shows exemplary abstraction model layers, in accordance with an embodiment of the present principles.

In an embodiment, the recurrent neural network (RNN) 200 is implemented in the cloud using a cloud-based server (see, e.g., FIGS. 10-12).

Figure 5:
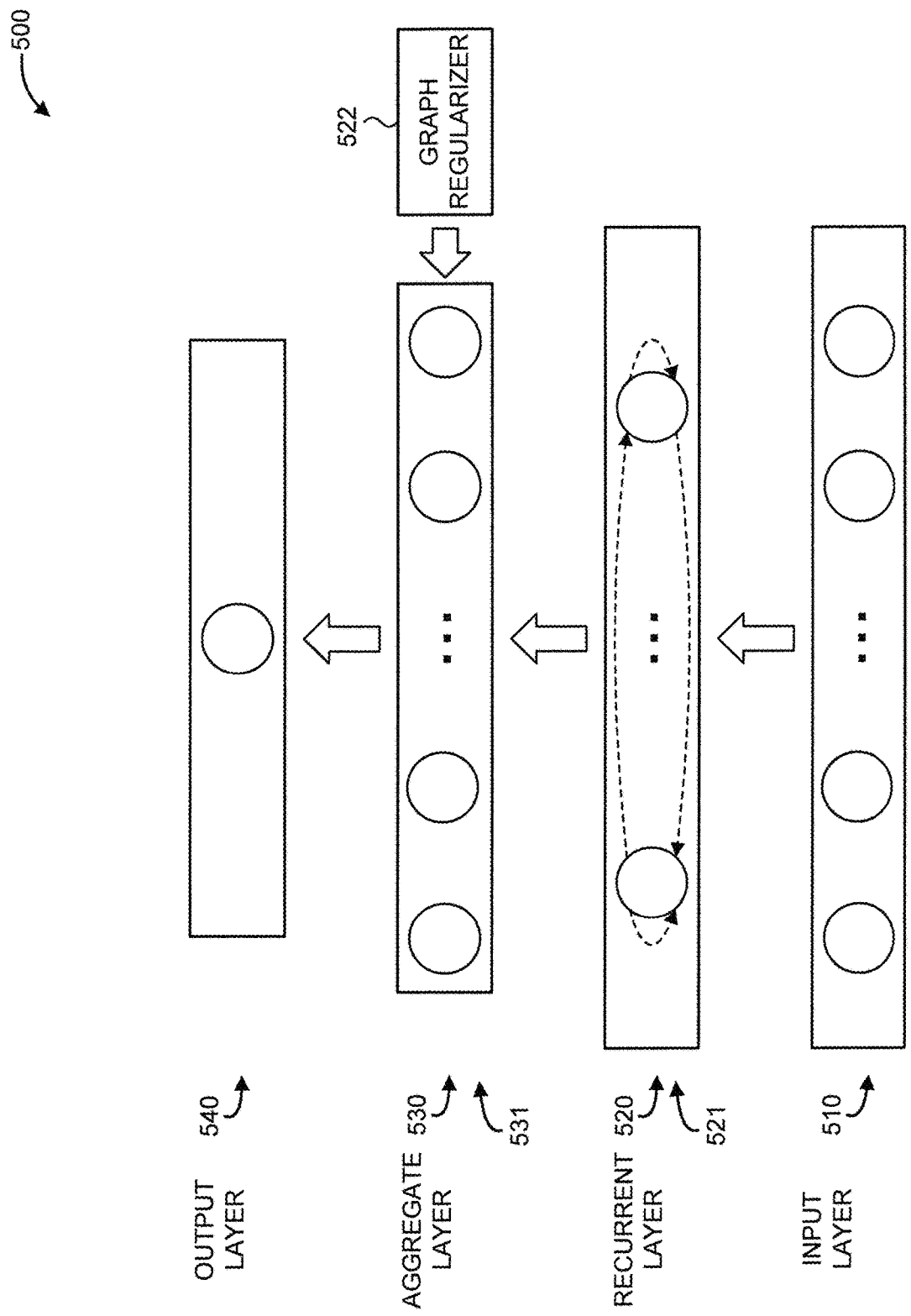
FIG. 5 shows an exemplary semi-supervised recurrent neural network for customer profile learning that uses partially labelled sequence data, in accordance with an embodiment of the present principles.

FIG. 5 shows an exemplary semi-supervised recurrent neural network (RNN) 500 for customer profile learning that uses partially labelled sequence data, in accordance with an embodiment of the present principles. As used herein, the term "semi-supervised" means supervised learning that also makes use of unlabeled data for training.

The semi-supervised recurrent neural network 500 includes an input layer 510, a recurrent layer 520, an aggregate layer 530, and an output layer 540. Moreover, the recurrent layer 520 includes a recurrent neural network 521, while the aggregate layer 530 includes an auto-encoder 531.

The semi-supervised recurrent neural network 500 of FIG. 5 adds a graph regularizer 522 to the aggregate layer 530.

As evident from FIG. 5, the recurrent neural network model 521 and the auto encoder 531 are stacked, with the aggregate layer further including the graph regularizer, in order to provide a semi-supervised deep recurrent neural network for customer profiling.

In semi-supervised recurrent neural network 500, the input data for the input layer 510 includes labeled training samples and unlabeled training samples. The unlabeled data and labeled data are jointly trained with the deep RNN. The generated sequences from the recurrent layer 520 are fed into the aggregate layer 530, which also receives input from the graph regularizer 522.

One or more graphs are constructed to describe the similarity between data samples, e.g. to regularize the data samples. For example, in an embodiment, the following equations can be used:

$$\Sigma |v_{ij}| \; v_{ij} = \begin{cases} \exp(-\|x_i - x_j\|) & x_i, x_j \text{ unlabeled} \\ 1 & y_i = y_j \\ 0 & y_i \neq y_j \end{cases}$$

where $v_{ij}$ denotes the pair-wise relationship between sample i and j, $x_i$ denotes the features of sample i, $x_j$ denotes the features of sample j, $y_i$ denotes the label of sample i, and $y_j$ denotes the label of sample j.

The graph regularizer 522 adds an additional term to the loss function, enforcing the learned weights satisfying the similarity constraint.

In an embodiment, the semi-supervised recurrent neural network (RNN) 500 is implemented in the cloud using a cloud-based server (see, e.g., FIGS. 10-12).

Figure 6:
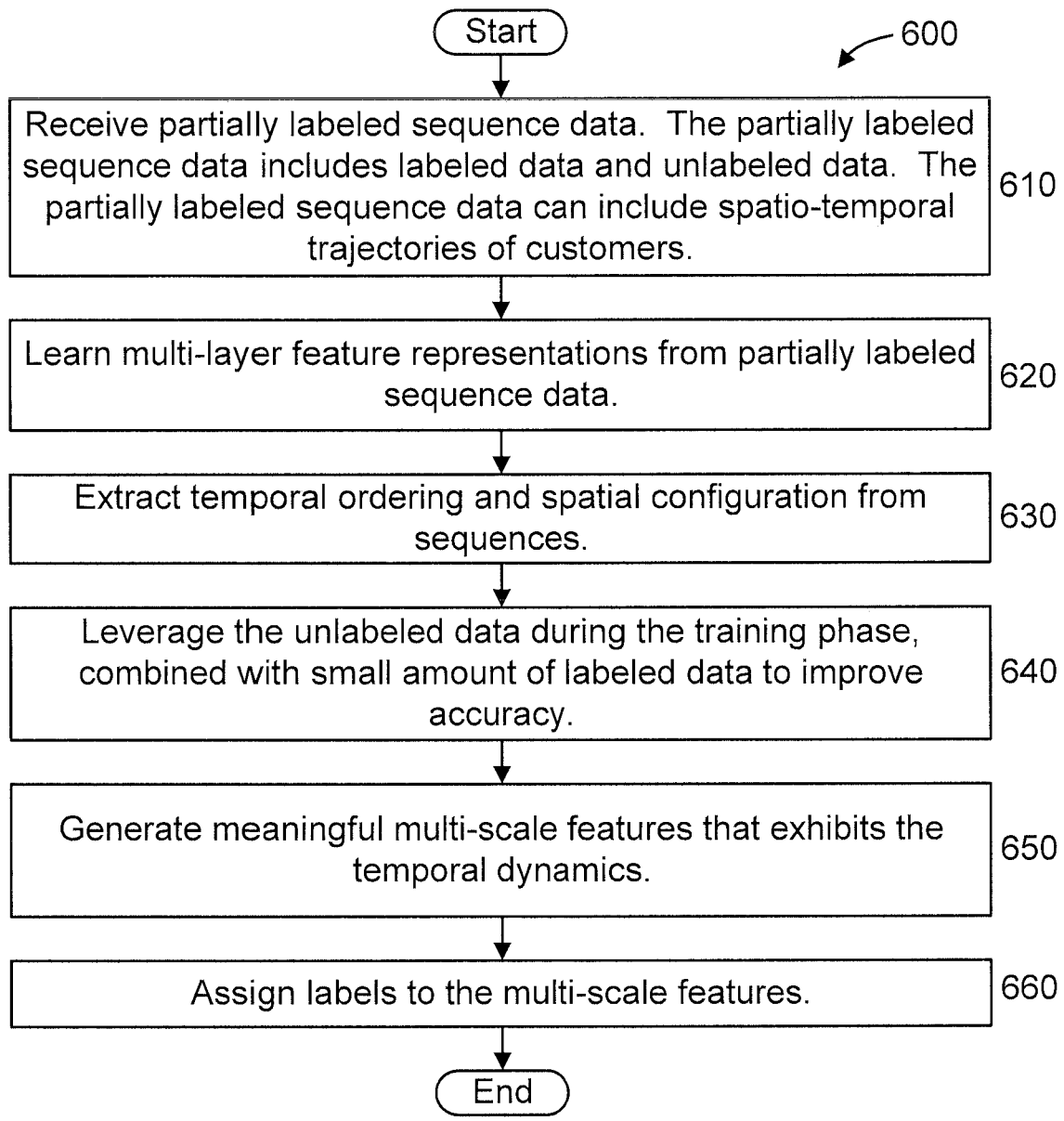
FIG. 6 shows an exemplary method for customer profile learning based on a recurrent neural network that uses partially labelled sequence data, in accordance with an embodiment of the present principles.

FIG. 6 shows an exemplary method 600 for customer profile learning based on a recurrent neural network that uses partially labelled sequence data, in accordance with an embodiment of the present principles. Method 600 corresponds to the recurrent neural network 200 of FIG. 2. The model stacks multiple recurrent neural networks (RNNs) to form the recurrent layer, which captures the long-range temporal dependency of the data. Each RNN is a feed-forward neural network with self-loops. Popular choices of a RNN include a long-short term memory (LSTM) and a gated recurrent unit (GRU). The outputs of the recurrent layer is aggregated in the aggregate layer to predict a label, which includes an auto-encoder/decoder structure.

At step 610, receive partially labeled sequence data. The partially labeled sequence data includes labeled data and unlabeled data. The partially labeled sequence data can include spatio-temporal trajectories of customers. For example, in an embodiment, the partially labeled sequence data can correspond, but is not limited to, any of the following: click behavior; speech; electroencephalography (EEG) data; text (e.g., words, sentences, etc.); handwriting; gene sequences, webcam images, webpages, and so forth. In an embodiment, step 610 relates to the input layer 210.

At step 620, learn multi-layer feature representations from partially labeled sequence data. As is evident, the feature representations are dependent upon the type of data input at step 610. For example, in the case of click behavior data, the features will relate to click features. Moreover, in the case of speech data, the features will relate to speech features. In an embodiment, step 620 relates to the recurrent layer 220.

At step 630, extract temporal ordering and spatial configuration from sequences. In an embodiment, step 630 relates to the recurrent layer 220.

At step 640, leverage the unlabeled data during the training phase, combined with (e.g., a small amount of) labeled data to improve accuracy. For example, large-scale text applications and image segmentation are examples of leveraging that can be implicated by step 640. In particular, the unlabeled data is utilized in an unsupervised learning fashion. For example, we can construct a Laplacian regularizer by computing pair-wise feature distances of unlabeled data points. In an embodiment, step 640 relates to the aggregate layer 230.

At step 650, generate meaningful multi-scale features that exhibits the temporal dynamics. In an embodiment, step 650 relates to the output layer 240.

At step 660, assign labels to the multi-scale features. In an embodiment, step 660 relates to the output layer 240.

Figure 7:
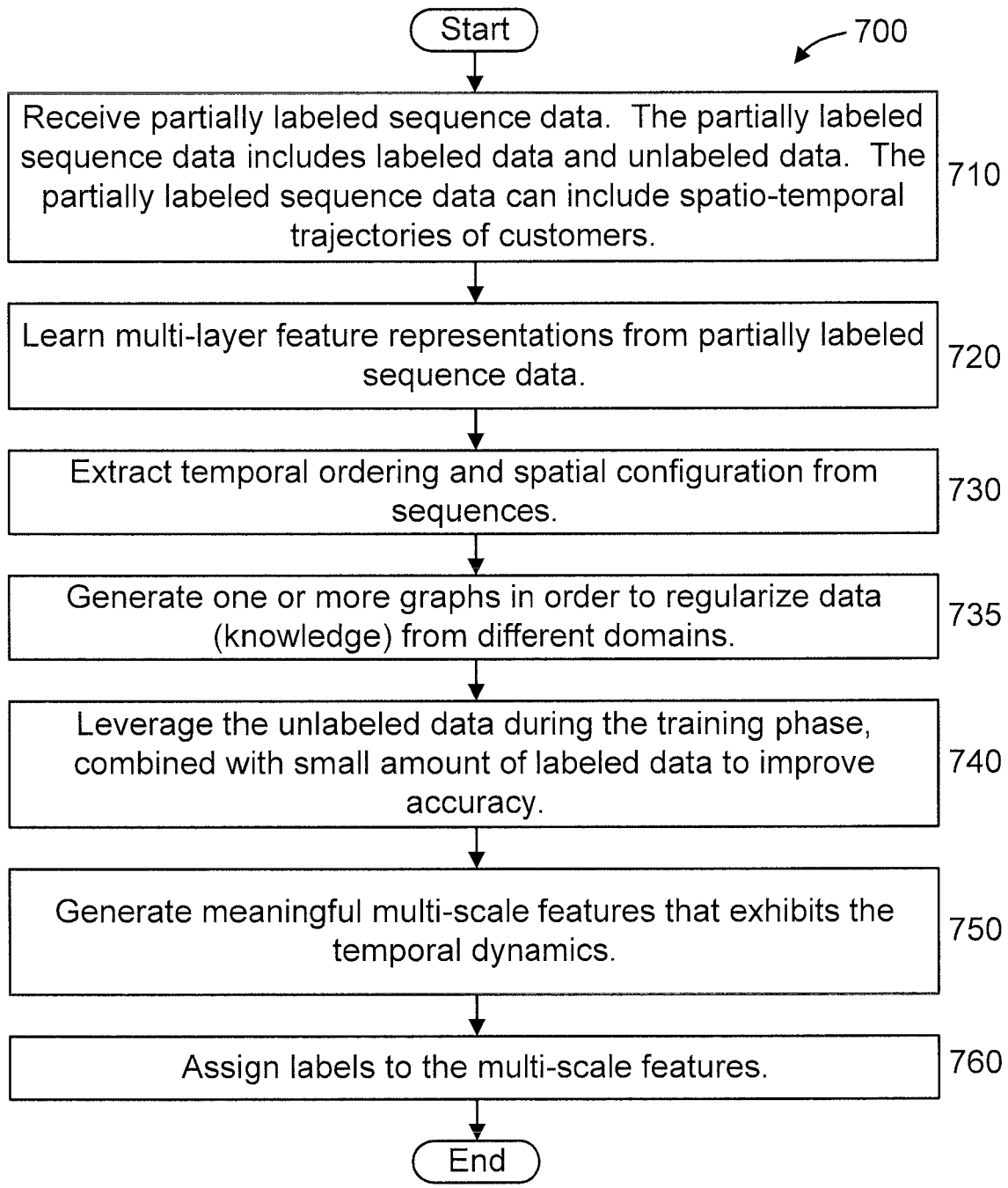
FIG. 7 shows an exemplary method for customer profile learning based on a semi-supervised recurrent neural network that uses partially labelled sequence data, in accordance with an embodiment of the present principles.

FIG. 7 shows an exemplary method 700 for customer profile learning based on a semi-supervised recurrent neural network that uses partially labelled sequence data, in accordance with an embodiment of the present principles. Method 700 corresponds to the semi-supervised recurrent neural network 500 of FIG. 5.

At step 710, receive partially labeled sequence data. The partially labeled sequence data includes labeled data and unlabeled data. The partially labeled sequence data can include spatio-temporal trajectories of customers. In an embodiment, step 710 relates to the input layer 510.

At step 720, learn multi-layer feature representations from partially labeled sequence data. As is evident, the feature representations are dependent upon the type of data input at step 710. In an embodiment, step 720 relates to the recurrent layer 520.

At step 730, extract temporal ordering and spatial configuration from sequences. In an embodiment, step 730 relates to the recurrent layer 520.

At step 735, generate one or more graphs in order to regularize data (knowledge) from different domains. As used herein, the term "different domains" relates to data or data sequences that pertain to different specific subject matters even if generally related. For illustrative sake, referring ahead to FIG. 8, note the multiple data types 810 which are capable of being processed by the semi-supervised recurrent neural network 830 using the graph regularizer 522 of FIG. 5. These multiple data types are of different domains, but can all be considered to relate to the general subject matter of a customer profile. These and other data types and domains to which the present principles can be applied are readily determined by one of ordinary skill in the art given the teachings of the present principles provided herein, while maintaining the spirit of the present principles.

At step 740, leverage the unlabeled data during the training phase, combined with (e.g., a small amount of) labeled data to improve accuracy. For example, large-scale text applications and image segmentation are examples of leveraging that can be implicated by step 740. In particular, the unlabeled data is utilized in a similar way to step 640 with a graph Laplacian regularizer. However, a difference here is that we will separately regularize with respect to different data domains. In an embodiment, step 740 relates to the aggregate layer 530.

At step 750, generate meaningful multi-scale features that exhibits the temporal dynamics. In an embodiment, step 750 relates to the output layer 540.

At step 760, assign labels to the multi-scale features. In an embodiment, step 760 relates to the output layer 540.

Figure 8:
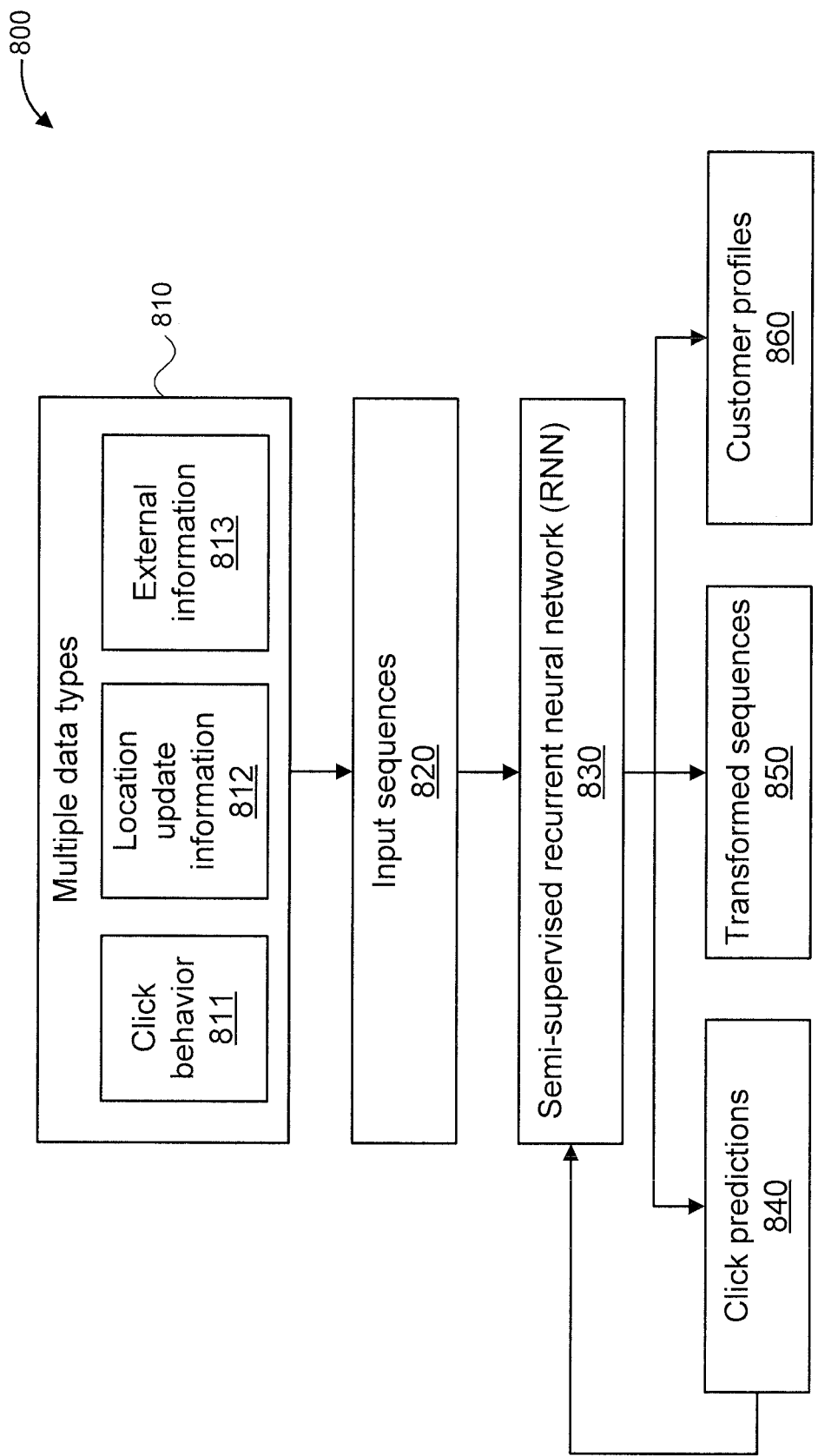
FIG. 8 shows an exemplary application of the present principles regarding click behavior prediction, in accordance with an embodiment of the present principles.
Figure 9:
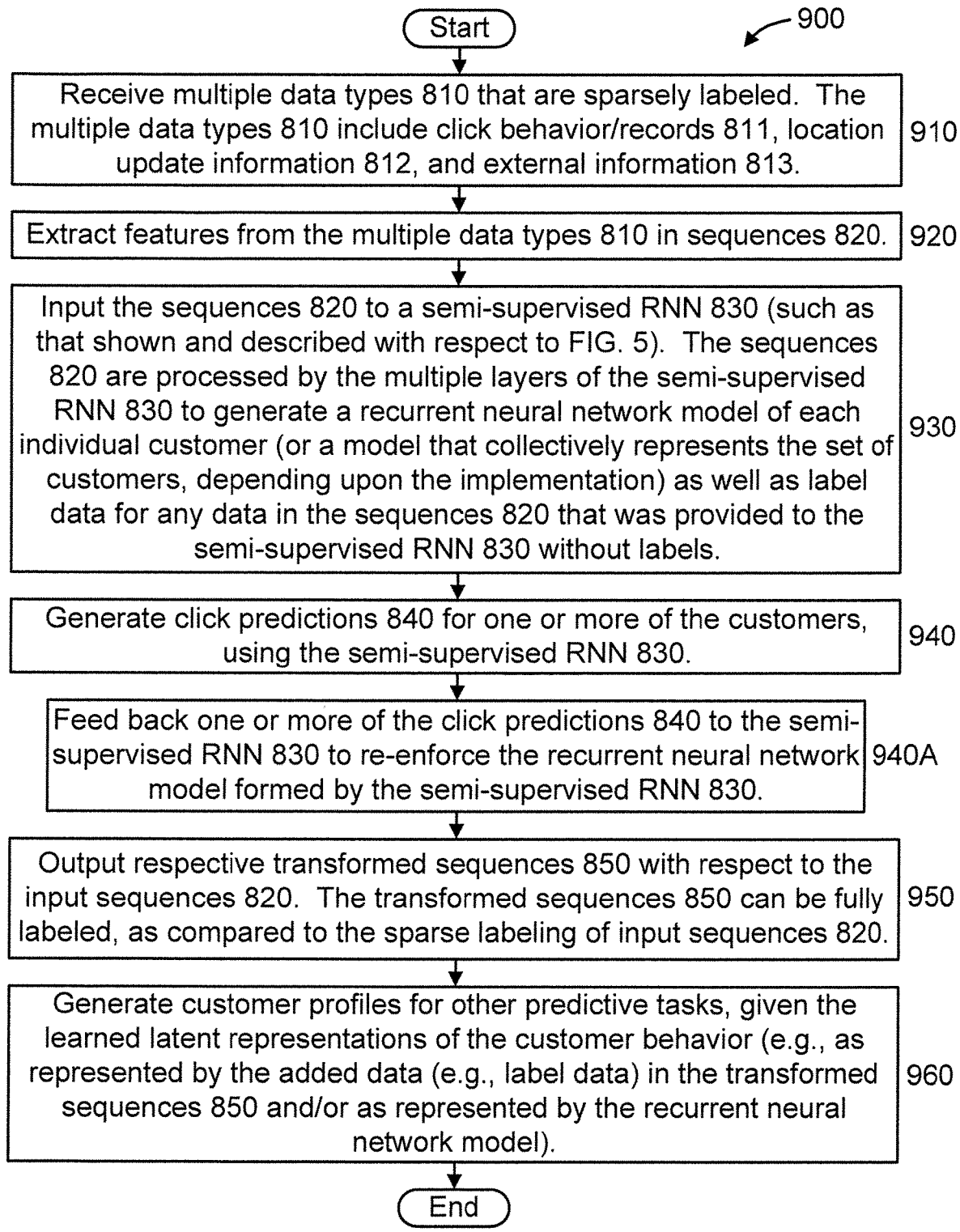
FIG. 9 shows a method for click behavior prediction, in accordance with an embodiment of the present principles.

FIG. 8 shows an exemplary application 800 of the present principles regarding click behavior prediction, in accordance with an embodiment of the present principles. FIG. 9 shows a method 900 for click behavior prediction, in accordance with an embodiment of the present principles. The method 900 is described with respect to the exemplary application 800 of FIG. 8.

At step 910, receive multiple data types 810 that are sparsely labeled. The multiple data types 810 include click behavior/records 811, location update information 812, and external information 813. The click behavior/records, the location update information, and the external information (e.g., places/shops of interest, and so forth) correspond to a set of individual customers.

At step 920, extract features from the multiple data types 810 in sequences 820.

At step 930, input the sequences 820 to a semi-supervised RNN 830 (such as that shown and described with respect to FIG. 5). The sequences 820 are processed by the multiple layers (e.g., 510, 520, 530, and 540) of the semi-supervised RNN 830 to generate a recurrent neural network model of each individual customer (or a model that collectively represents the set of customers, depending upon the implementation) as well as label data for any data in the sequences 820 that was provided to the semi-supervised RNN 830 without labels.

At step 940, generate click predictions 840 for one or more of the customers, using the semi-supervised RNN 830.

In an embodiment, step 940 includes step 940A.

At step 940A, feed back one or more of the click predictions 840 to the semi-supervised RNN 830 to re-enforce the recurrent neural network model formed by the semi-supervised RNN 830.

At step 950, output respective transformed sequences 850 with respect to the input sequences 820. The transformed sequences 850 can be fully labeled, as compared to the sparse labeling of the input sequences 820.

At step 960, generate customer profiles for other predictive tasks, given the learned latent representations of the customer behavior (e.g., as represented by the added data (e.g., label data) in the transformed sequences 840 and/or as represented by the recurrent neural network model).

A description will now be given regarding exemplary applications/uses to which the present principles can be applied, in accordance with an embodiment of the present principles.

For example, the present principles can be used to process sequential data such as, but not limited to, speech signals, EEG data, and/or text sentences, particularly when the labels are costly to obtain. Moreover, the present principles can be used to extract informative features of sequential data which can be later used for other predictive tasks. Also, the present principles can be used to generate multi-scale representations of an input sequence, which can provide insights for the temporal dynamics of the system. Additionally, the present principles can be used to add functionality and value to better the user experience of applications such as, but not limited to, mobile messaging, and so forth. Moreover, the present principles can be used to analyze and fully utilize structures present in sequential data. Further, the present principles can be used for user intent understanding, advertisement targeting, customer profile intelligence, and so forth. These and many other applications to which the present principles can be applied are readily determined by one of ordinary skill in the art given the teachings of the present principles provided herein.

A description will now be given regarding some exemplary advantages provided by the present principles.

Advantageously, the present principles provide a novel semi-supervised deep learning model of sequence data. Moreover, the present principles can capture complex, multiple-level temporal dependence with a deep recurrent neural network (RNN) model. Also, the present principles boost the predictive power of a RNN by jointly utilizing the unlabeled data with the labeled data, thus reducing the cost of obtaining labels. Additionally, a graph regularizer allows incorporation of different domain knowledge. These and many other attendant advantages of the present principles are readily determined by one of ordinary skill in the art given the teachings of the present principles provided herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 10, a schematic of an example of a cloud computing node 1010 is shown. Cloud computing node 1010 is only one example of a suitable cloud computing node and is not intended to suggest any limitation as to the scope of use or functionality of embodiments of the invention described herein. Regardless, cloud computing node 1010 is capable of being implemented and/or performing any of the functionality set forth hereinabove.

In cloud computing node 1010 there is a computer system/server 1012, which is operational with numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1012 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1012 in cloud computing node 1010 is shown in the form of a general-purpose computing device. The components of computer system/server 1012 may include, but are not limited to, one or more processors or processing units 1016, a system memory 1028, and a bus 1018 that couples various system components including system memory 1028 to processor 1016.

Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1012 typically includes a variety of computer system readable media. Such media may be any available media that is accessible by computer system/server 1012, and it includes both volatile and non-volatile media, removable and non-removable media.

System memory 1028 can include computer system readable media in the form of volatile memory, such as random access memory (RAM) 1030 and/or cache memory 1032. Computer system/server 1012 may further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, memory 1028 may include at least one program product having a set (e.g., at least one) of program modules that are configured to carry out the functions of embodiments of the invention.

Program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer system/server 1012 may also communicate with one or more external devices 1014 such as a keyboard, a pointing device, a display 1024, etc.; one or more devices that enable a user to interact with computer system/server 1012; and/or any devices (e.g., network card, modem, etc.) that enable computer system/server 1012 to communicate with one or more other computing devices. Such communication can occur via Input/Output (I/O) interfaces 1022. Still yet, computer system/server 1012 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, external disk drive arrays, RAID systems, tape drives, and data archival storage systems, etc.

Referring now to FIG. 11, illustrative cloud computing environment 1150 is depicted. As shown, cloud computing environment 1150 comprises one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include mainframes; RISC (Reduced Instruction Set Computer) architecture based servers; blade servers; storage devices; networks and networking components. Examples of software components include network application server software; and database software.

Virtualization layer 1262 provides an abstraction layer from which the following examples of virtual entities may be provided: virtual servers; virtual storage; virtual networks, including virtual private networks; virtual applications and operating systems; and virtual clients.

In one example, management layer 1264 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1266 provides examples of functionality for which the cloud computing environment may be utilized. Examples of workloads and functions which may be provided from this layer include: mapping and navigation; software development and lifecycle management; virtual classroom education delivery; data analytics processing; transaction processing; and profile learning based on a RNN.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for label learning, comprising:
generating, by a computer, a deep semi-supervised recurrent neural network having an aggregate layer stacked on a recurrent layer such that outputs of the recurrent layer are fed to inputs of the aggregate layer, the recurrent layer comprising a recurrent neural network configured to model and train sequence data that includes labeled data and unlabeled data such that the labeled and unlabeled data are jointly used for training, the aggregate layer configured to aggregate sequences generated from the recurrent layer to predict label classifications for the unlabeled data and comprising a graph regularizer allowing incorporation of different domain knowledge using a graph-based supervised learning process and a dimension-reducing auto encoder that is stacked on the recurrent neural network and is configured to learn a dimensionally reduced representation of the sequence data including the different domain knowledge by reducing an overall number of dimensions of the sequence data including the labeled and unlabeled data directly provided to an output layer of the deep semi-supervised recurrent neural network from the auto encoder;

generating, by the computer, one or more customer behavior predictions using the deep semi-supervised recurrent neural network; and generating, by the computer, a targeted advertisement responsive to the one or more customer behavior predictions, wherein the deep semi-supervised recurrent neural network feeds the sequences generated from the recurrent layer into the aggregate layer for aggregation, stores temporal dependencies in the sequence data, and generates labels for at least some of the unlabeled data.

2. The method of claim 1, wherein the deep semi-supervised recurrent neural network is generated to form a deep semi-supervised recurrent neural network having the recurrent layer and the aggregate layer by applying the graph-based supervised learning process to the unlabeled data.

3. The method of claim 2, wherein the graph-based supervised learning process is applied to the unlabeled data in the aggregation layer of the deep semi-supervised recurrent neural network.

4. The method of claim 3, wherein the aggregation layer in the aggregation layer of the deep semi-supervised recurrent neural network and the graph-based supervised learning process provide aggregation of data having different domains.

5. The method of claim 2, wherein the one or more customer behavior predictions are generated using the deep semi-supervised recurrent neural network, wherein the one or more customer behavior predictions are generated based on a joint utilization of the labeled data and the unlabeled data.

6. The method of claim 2, wherein the graph-based supervised learning process is applied to the labeled data and the unlabeled data to extract similarity data there between, and wherein the deep semi-supervised recurrent neural network is formed using the similarity data.

7. The method of claim 1, wherein the generated sequences from the recurrent layer correspond to different domains that are regularized in the aggregate layer based on graph data.

8. The method of claim 1, further comprising constructing one or more graphs to describe a similarity between data samples in the sequence data as an input to the deep semi-supervised recurrent neural network.

9. The method of claim 8, wherein the aggregate layer performs data aggregation based on the similarity between the data samples.

10. The method of claim 1, wherein at least one of the customer behavior predictions comprises at least one response rate prediction.

11. A non-transitory article of manufacture tangibly embodying a computer readable program which when executed causes a computer to perform the steps of claim 1.

12. A system, comprising:
a computer, having a processor and a memory, configured to:
generate a deep semi-supervised recurrent neural network having an aggregate layer stacked on a recurrent layer such that outputs of the recurrent layer are fed to inputs of the aggregate layer, the recurrent layer comprising a recurrent neural network configured to model and train sequence data that includes labeled data and unlabeled data such that the labeled and unlabeled data are jointly used for training, the aggregate layer configured to aggregate sequences generated from the recurrent layer to predict label classifications for the unlabeled data and comprising a graph regularizer allowing incorporation of different domain knowledge using a graph-based supervised learning process and a dimension-reducing auto encoder that is stacked on the deep semi-supervised recurrent neural network and is configured to learn a dimensionally reduced representation of the sequence data including the different domain knowledge by reducing an overall number of dimensions of the sequence data including the labeled and unlabeled data directly provided to an output layer of the deep semi-supervised recurrent neural network from the auto encoder;
generating one or more customer behavior predictions using the deep semi-supervised recurrent neural network; and
generating a targeted advertisement responsive to the one or more customer behavior predictions,
wherein the deep semi-supervised recurrent neural network feeds the sequences generated from the recurrent layer into the aggregate layer for aggregation, stores temporal dependencies in the sequence data, and generates labels for at least some of the unlabeled data.

13. The system of claim 12, wherein the computer is implemented as a server using a cloud computing configuration.

14. The system of claim 12, wherein the computer generates the deep semi-supervised recurrent neural network to form a deep semi-supervised recurrent neural network having the recurrent layer and the aggregate layer by applying the graph-based supervised learning process to the unlabeled data.

15. The system of claim 14, wherein the graph-based supervised learning process is applied to the unlabeled data in the aggregation layer of the deep semi-supervised recurrent neural network.

16. The system of claim 14, wherein the one or more customer behavior predictions are generated using the deep semi-supervised recurrent neural network, wherein the one or more customer behavior predictions are generated based on a joint utilization of the labeled data and the unlabeled data.

17. The system of claim 14, wherein the graph-based supervised learning process is applied to the labeled data and the unlabeled data to extract similarity data there between, and wherein the deep semi-supervised recurrent neural network is formed using the similarity data.

* * * * *